Sept. 30, 1958 J. MULLER 2,854,140
APPARATUS FOR AUTOMATIC CLEARING OF FILTERS IN USE
Filed Oct. 11, 1956 12 Sheets-Sheet 1

INVENTOR
JACQUES MULLER
By Young, Emery & Thompson
ATTORNEYS

Sept. 30, 1958 J. MULLER 2,854,140
APPARATUS FOR AUTOMATIC CLEARING OF FILTERS IN USE
Filed Oct. 11, 1956 12 Sheets-Sheet 2
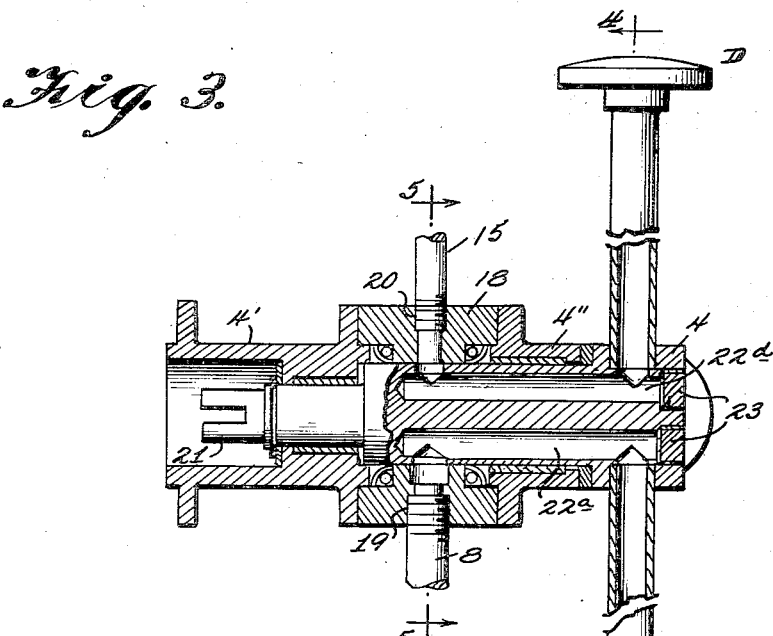
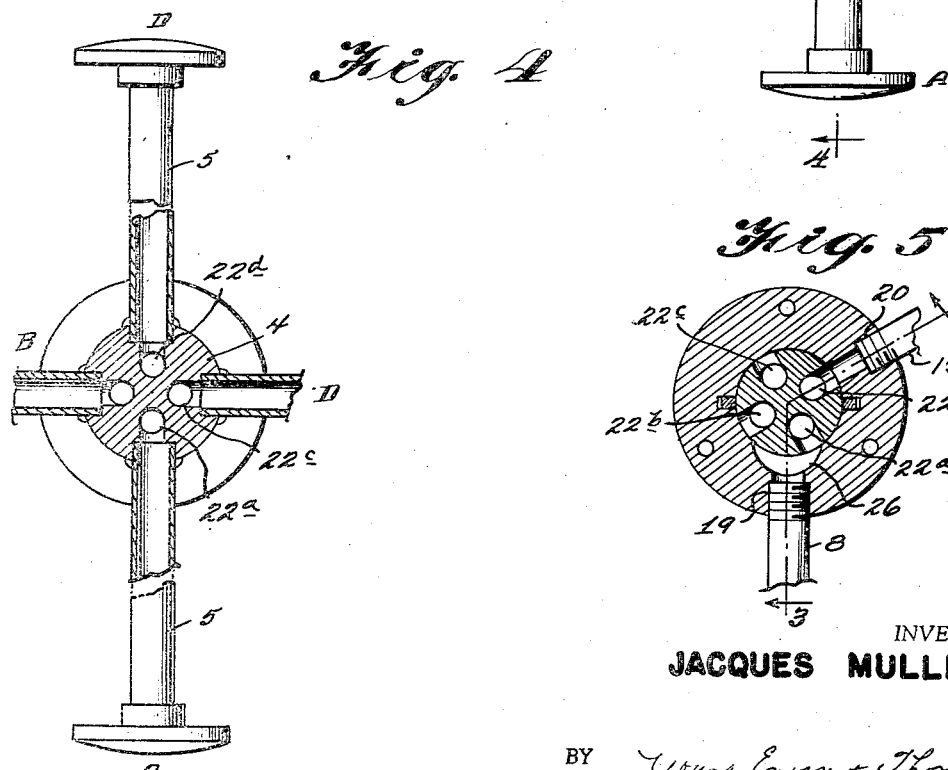
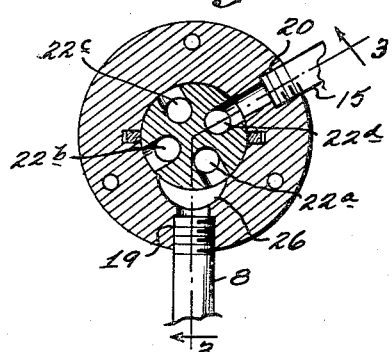
INVENTOR
JACQUES MULLER
BY *Young, Emery & Thompson*
ATTORNEYS

INVENTOR
JACQUES MULLER

BY *Young, Emery & Thompson*

ATTORNEYS

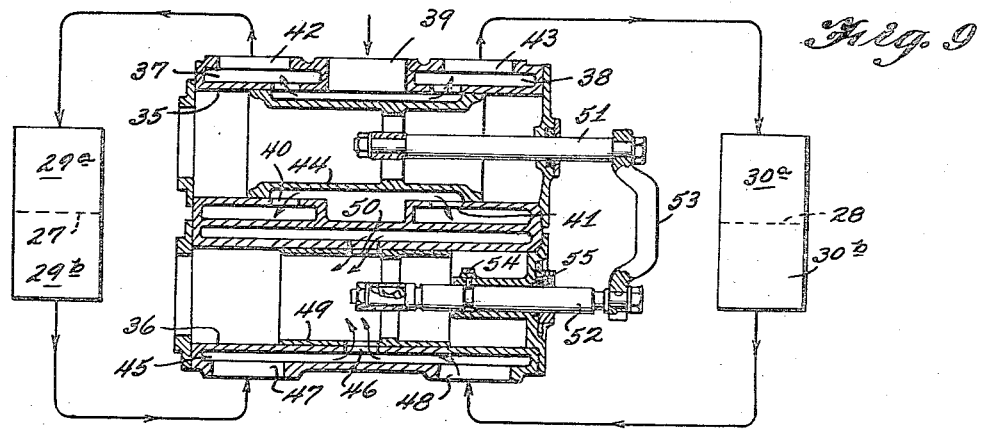
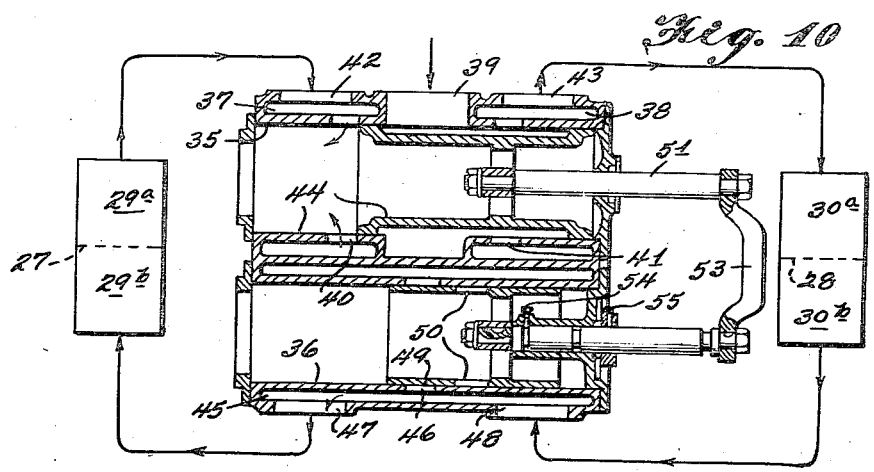
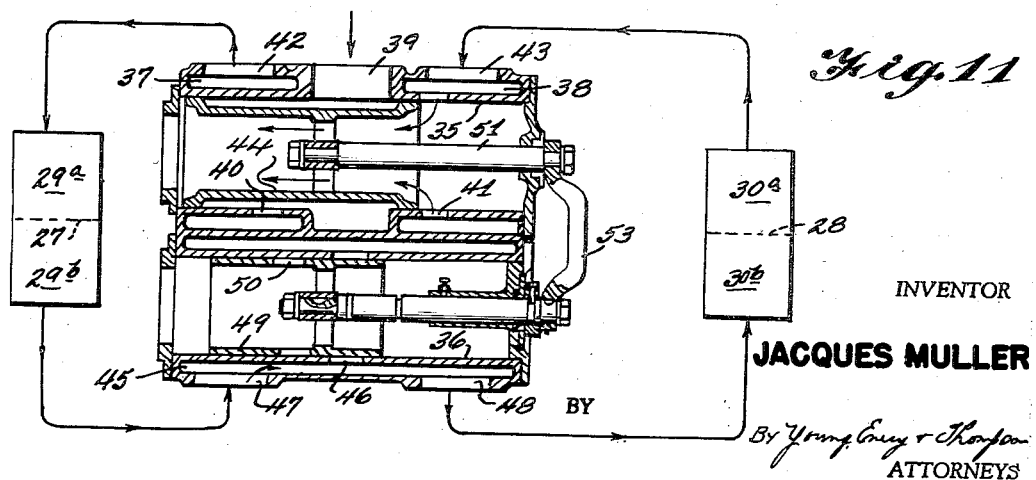

Sept. 30, 1958  J. MULLER  2,854,140
APPARATUS FOR AUTOMATIC CLEARING OF FILTERS IN USE
Filed Oct. 11, 1956  12 Sheets-Sheet 5
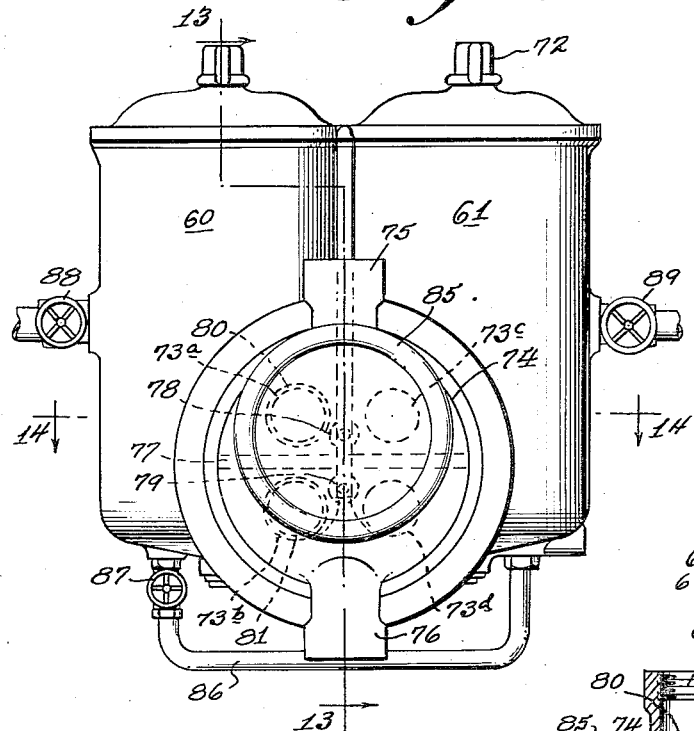
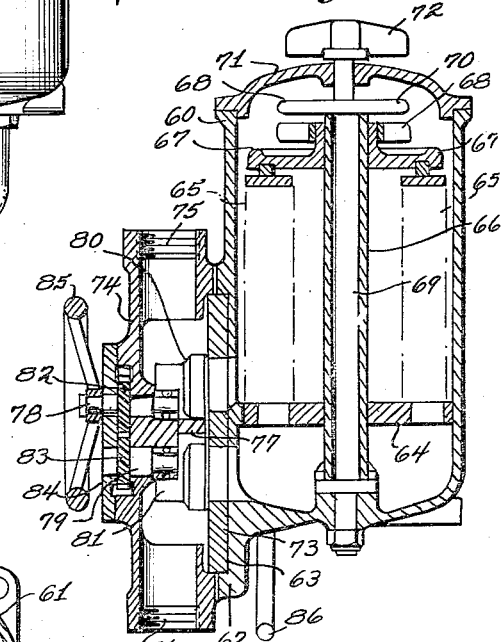
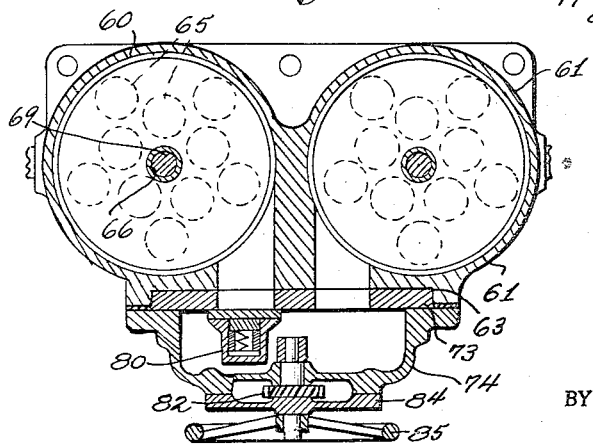
INVENTOR
JACQUES MULLER
BY Young, Emery & Thompson
ATTORNEYS

INVENTOR
JACQUES MULLER

Sept. 30, 1958 J. MULLER 2,854,140
APPARATUS FOR AUTOMATIC CLEARING OF FILTERS IN USE
Filed Oct. 11, 1956 12 Sheets-Sheet 7

INVENTOR
JACQUES MULLER

BY Young, Emery & Thompson
ATTORNEYS

Sept. 30, 1958 J. MULLER 2,854,140
APPARATUS FOR AUTOMATIC CLEARING OF FILTERS IN USE
Filed Oct. 11, 1956 12 Sheets-Sheet 8

INVENTOR
JACQUES MULLER
BY Young, Emery & Thompson
ATTORNEYS

Sept. 30, 1958    J. MULLER    2,854,140
APPARATUS FOR AUTOMATIC CLEARING OF FILTERS IN USE
Filed Oct. 11, 1956    12 Sheets-Sheet 11

INVENTOR
JACQUES MULLER

BY Young, Emery & Thompson
ATTORNEYS

Sept. 30, 1958 J. MULLER 2,854,140
APPARATUS FOR AUTOMATIC CLEARING OF FILTERS IN USE
Filed Oct. 11, 1956 12 Sheets-Sheet 12
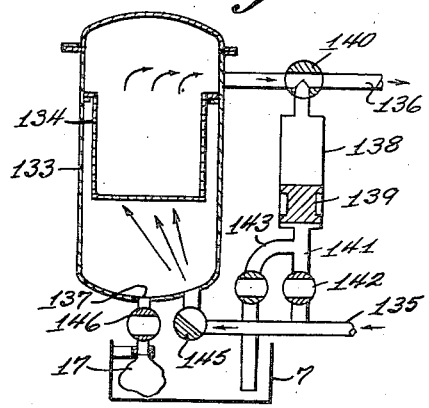
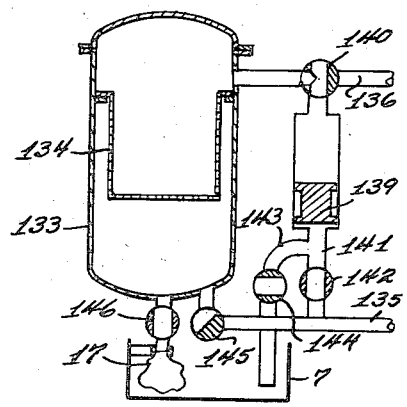
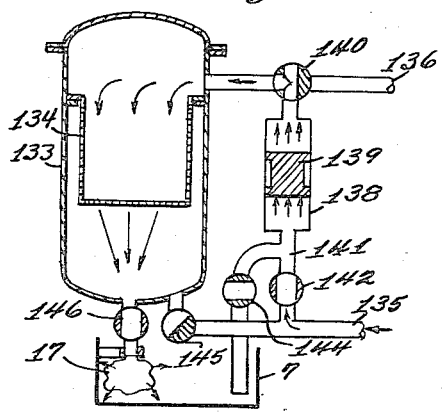
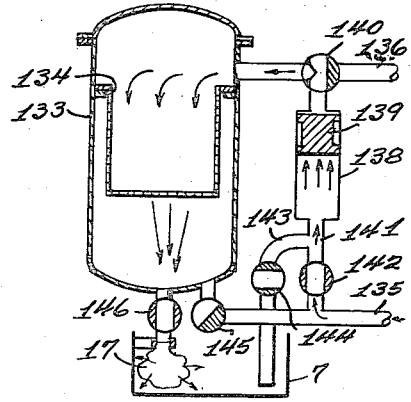
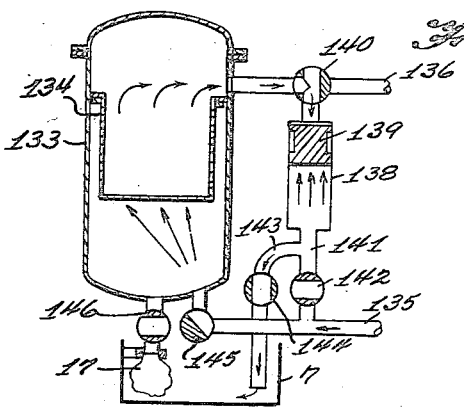
INVENTOR
JACQUES MULLER
BY Young, Emery & Thompson
ATTORNEYS United States Patent Office 2,854,140
Patented Sept. 30, 1958

2,854,140
APPARATUS FOR AUTOMATIC CLEARING OF FILTERS IN USE

Jacques Muller, La Garenne-Colombes, France

Application October 11, 1956, Serial No. 615,380

Claims priority, application France October 11, 1955

4 Claims. (Cl. 210—90)

The present invention relates to apparatus for automatic clearing of filters so they can be reused without dismounting or repair.

It is known that the purification to a greater and greater degree of fluids or liquids by filtration involves a rapid clearing of the filters which requires frequent replacement thereof or clearing thereof when this is possible. In the case of machines adapted for working metals, it has also been proposed to use magnetic collectors which retain the ferrous metal particles in the cooling and lubrication liquids, however, without retaining the non-ferrous particles and abrasive residues and without insuring the desired degree of purity of these liquids.

The purpose of the present invention is to provide an apparatus making it possible to extend to a maximum the useful life of filters by means of an automatic continuous or periodic clearing without dismounting, and removing from the fluids or liquids even impurities with micrometric particles.

The principle of the invention consists in equipping the filtering apparatus with at least two filters connected alternatively by means of a distributor in such a manner that one of the filters may be used for purification by aspiration of a polluted fluid or liquid, while the other filter is cleared by a fluid or liquid under pressure and already purified preferably by a part of the purified fluid or liquid coming from the filter used for the filtration.

It is of course possible to imagine numerous methods of application of this principle. Some of these methods of application will be described hereinafter in detail by way of non-limiting examples, with reference to the attached drawing in which:

Fig. 1 is a schematic view of the principle of an apparatus for automatic clearing of liquid filters adapted for an installation with a low output.

Fig. 2 is a perspective schematic view of this apparatus.

Fig. 3 is a longitudinal sectional view of the distributor taken on line III—III of Fig. 5.

Fig. 4 is a transverse cross-sectional view taken on line IV—IV of Fig. 3.

Fig. 5 is a cross-sectional view taken on line V—V of Fig. 3.

Figs. 9, 10 and 11 are longitudinal sectional views of the distributor of this apparatus, and show the various positions of operation of this distributor.

Fig. 12 is a front view of a modification of the apparatus.

Fig. 13 is a vertical sectional view taken on line XIII—XIII of Fig. 12.

Fig. 14 is a transverse cross-sectional view taken on line XIV—XIV of Fig. 12.

Figs. 38 to 42 are schematic views showing the different positions of operation of an apparatus comprising a filter and a hydraulically-actuated clearing pump.

Figure 6:
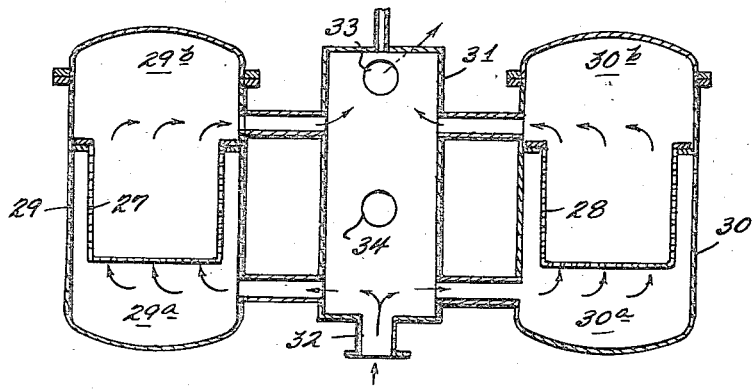
Figs. 6 to 8 are schematic views of an apparatus for automatic clearing of filters adapted for an installation with a high output, and show the various positions of operation of this apparatus.

The apparatus shown in Figs. 1 and 2 comprises an electric motor 1, the shaft of which is coupled at one end to a rotary pump 2 and at the other end to a speed reducer 3. The output shaft of this speed reducer is coupled to the rotary valve element 4 of a horizontal distributor valve having a fixed housing or casing 4a. On the end of the rotary valve element 4 opposite the reducer 3 is mounted a turnstile-like rotary member with four radial arms 5, in the form of a cross. The arms 5 are of equal lengths and are formed by tubes each of which carries, respectively, at its free end a flat filter 6, for example a disc of calibrated porosity which is formed by coiling a strip having on its two surfaces micro-furrows or grooves traced in width, conical grooves, etc. The turnstile-like member is arranged to rotate in a vertical plane and in the direction of the arrow above a liquid collector tank 7 in such a manner that each filter 6 can be immersed in turn in the liquid contained in this tank. To one region of the valve casing or housing 4a, which the rotary element 4 of the distributor valve has placed in communication with the tube 5 descending at the time, is connected the intake conduit 8 of the pump 2. This pump discharges through a conduit 9 into a pressure storage chamber and pressure indicator 10. This chamber may be a cylinder containing a spring-loaded piston or a diaphragm, either of which has a rod 11 extending from the cylinder and carrying an index 12 for indicating the pressure on a fixed graduated scale 13. From the chamber 10 two lateral conduits 14 and 15 extend. Conduit 14 extends to the machine to be supplied with the liquid. Conduit 15 opens into a port in the casing of the distributor valve which the rotary valve element 4 places in communication with the tube 5 which at the time is moving to the right in Figs. 1 and 2. The tube moving at the time to the left as well as the tube rising at the time do not communicate with either of the conduits 8 and 15. The liquid to be filtered comes from the machine through a conduit 16 which opens into a porous sack with close mesh 11 hung inside the tank and adapted to retain the major part of the coarse impurities. After the sack is full, it is thrown away and replaced with a new sack. Its use prevents the coarse impurities from depositing in the tank, which permits elimination of the cleaning of the latter.

The details of the distributor valve are given in Figs. 3, 4 and 5. The rotary valve element 4 is mounted to rotate in the casing or housing 4a formed by two coaxial tubular elements 4', 4", of which the one on the left (Fig. 3) is attached by a flange to the casing of the speed reducer 3. The two ends of the two elements 4', 4", facing each other, are also provided with flanges on the inside faces of which are formed annular grooves. In these grooves is fitted a cylindrical sleeve 18 which is assembled by means of threaded bolts with the elements 4', 4" of the casing 4a. This sleeve 18 has, on its circumference intermediate its ends, two orifices 19, 20, one in the bottom and one on the right side (Fig. 5) a little above the horizontal plane passing through the axis of the distributor valve. In this connection it should be noted that for greater clarity the two planes of the section III—III in Fig. 5 are assumed to be developed in the extension of each other in Fig. 3. To the bottom orifice 19 is connected the intake conduit 8 of the pump 2. To orifice 20 is connected the branch conduit 15 from the pressure storage chamber 10. In the inner circumference of the sleeve 18, on each side of the plane of the orifices 19 and 20, are cut annular grooves in which sealing gaskets are embedded.

The rotary valve element 4 is a cylindrical piece mounted with a low friction fit in the assembly formed by the casing 4a and the sleeve 18. Its left end is extended by a slotted tip to effect a coupling in rotation with the output shaft of the speed reducer 3. In the cylindrical rotary element 4 are formed four longitudinal parallel channels 22a, 22b, 22c, 22d, distributed uniformly around the axis of rotation. These channels start from the free end of the element and extend longitudinally somewhat beyond the plane of the orifices 19, 20 when the element is properly mounted in the casing. The orifices of the channels at the free end of the element 4 are closed by threaded plugs 23. Each channel has two lateral orifices opening in the peripheral surface of the slide, one of which is located in the plane of orifices 19, 20, while the other is connected to one of the tubes forming the arms 5 of the turnstile-like member.

This filtering and automatic clearing apparatus operates in the following manner:

The motor 1 driving the pump 2 and the speed reducer 3 makes the turnstile-like member rotate slowly in the direction of the arrow (Figs. 1 and 2), so that each filter 6 passes in each rotation successively through position A, B, C, D. The filter occupying position A, in which it is completely immersed in the liquid in tank 7, communicates by its tube 5 and channel 22a of the rotary valve element 4 with the orifice 19 of the sleeve 18, and in turn with the intake or suction conduit 8 of the pump. The filter that has reached position B, and has just come out of the liquid, does not communicate with either conduits 8 or 15, because the lateral orifice of its channel 22b is masked by the casing 4a. It is the same for the filter passing through position C. On the contrary, the filter passing through position D communicates by means of its channel 22d with the orifice 20 of sleeve 18, therefore with the conduit 15 coming from the pressure storage chamber 10, through which, therefore, is discharged a part of the filtered liquid which the pump 2 discharges into the storage chamber. This part of the discharged liquid is therefore ejected through the filter in question, that is to say, in a direction opposite to that in which the filtering takes place. The impurities adhering to the surface of the filter are thereby dislodged and collected with the liquid ejected in an auxiliary collector 24 (Figs. 1 and 2) fixed to the corresponding side of the filter tank 7 and provided with a tube and valve 25 for drainage. The filter thus cleared and cleaned redescends from position D to position A during the continued rotation of the turnstile-like member. The filter is thus again immersed in the liquid and consequently begins again a fresh cycle of filtering.

Due to a cavity 26 (Fig. 5) in the sleeve 18, and extending over almost a quarter of the circumference of the distributor element 4 on both sides of orifice 19, it can be arranged that the filter coming from position D will be already immersed before the filter leaving position A has left the liquid, which permits the pump 2 to draw liquid through the filters practically without interruption and thereby to supply the machine with a continuous current of coolant and lubricant, the continuity of this current of liquid being additionally insured by the storage chamber 10 which also serves as a compensator for slight variations in the flow from the pump.

For installations with a large output requiring filters with a large surface, it is difficult to mount these filters on a turnstile-like member as in the example just described. It is nevertheless possible to solve the problem, even with fixed filters, still combined with a distributor.

Figure 7:
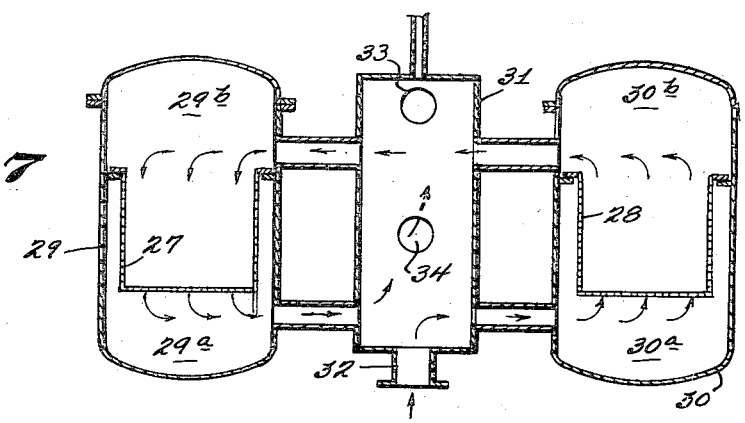
Figure 8:
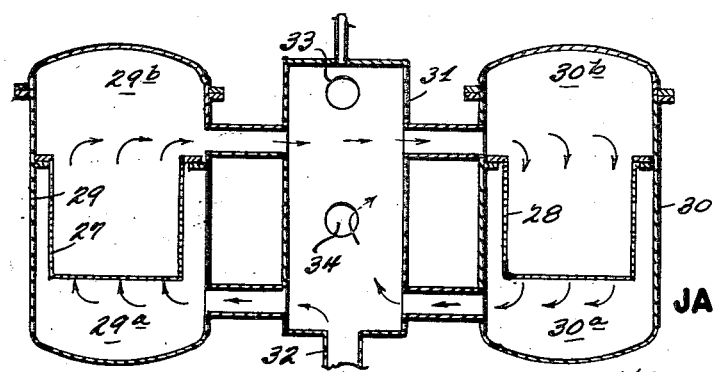

Figs. 6 to 8 show schematically an example of application of the principle of the invention for an installation with a large output functioning with fixed filters.

The apparatus in question comprises two filters 27 and 28 with large surface, respectively, mounted in closed chambers 29 and 30 which they divide into two compartments 29a, 29b, 29c and 29d. Each compartment communicates by means of a tube with a distributor 31 with a sliding valve fitted with a tube 32 through which the fluid or liquid to be filtered enters, a tube 33 through which the filtered fluid or liquid discharges, and a tube 34 through which is withdrawn the fluid or liquid, already filtered, used for clearing the filters. The tube 33 is connected by piping to the machine which is to be supplied with filtered fluid or liquid. Tube 34 is connected by piping to an additional separator, for example, with a sack similar to the sack 17 in the example described previously.

The operation of this apparatus is as follows:

The distributor 31 is the type with three axial positions of the slide. In the first position (Fig. 6), it places the input tube 32 in communication with the two compartments 29a, 30a on one side of filters 27, 28, and tube 33 in communication with the two compartments 29b, 30b on the opposite side of the filters, while no communication is established with the tube 34. The fluid or liquid to be filtered, entering through tube 32, then passes simultaneously through the two filters 27 and 28 and issues, after purification, through tube 33 to be conducted toward the point of use.

In the second position of the slide (Fig. 7), the fluid or liquid to be filtered, entering through tube 32, passes into compartment 30a of the right-hand chamber 30, passes through filter 28 and, after its purification, flows into compartment 30b. It then passes through the distributor 31 into compartment 29b of the left-hand chamber 29, passes through filter 27 in the direction opposite to that of filtering and then discharges the impurities by penetrating into compartment 29a, and entrains these impurities through the distributor towards the discharge tube 34. The tube 33 does not communicate with any of the filters.

In the third position of the slide (Fig. 8), the fluid or liquid to be filtered entering through tube 32 passes into compartment 29a of the left-hand chamber 29, passes through filter 27, and flows, after purification, into compartment 29b, from which it passes through the distributor 31 into compartment 30b of the right-hand chamber 30, passes through the filter 28 in the direction opposite to that of filtering and thereby removes the impurities by penetrating into compartment 30a, and entrains these impurities through the distributor towards the discharge tube 34. The tube 33 still does not communicate with any of the filters.

Naturally, during the filtration through one of the filters and the clearing of the other, it is possible to use only a part of the filtered fluid or liquid for the clearing and to have the other part pass towards the point of use as in the example described with reference to Figs. 1 and 2.

The details of the sliding valve distributor in this apparatus are shown in Figs. 9 to 11, which also show the three positions of the slide corresponding to the distribution as just described with respect to Figs. 6 to 8.

In this example it is a question of a distributor with two casings 35 and 36 parallel and side by side, provided in a casting, which makes it possible to simplify the piping connecting the two chambers 29 and 30 containing the filters 27 and 28. The casing 35 is surounded with two coaxial annular chambers 37 and 38 separated by a central entrance orifice 39. In the cylindrical wall of this casing are provided two peripheral rows of orifices 40 and 41 which open respectively into the annular chambers 37 and 38. In the outer walls of the two chambers are two orifices 42 and 43. In the outer circumference of the slide 44 is formed a peripheral groove, the width of which is selected so that it may expose simultaneously the two rows of orifices 40 and 41 when the slide occupies the middle or first position.

The casing 36 is surrounded with an annular chamber 45 which extends from one end to the other. In the cylindrical wall of this casing is provided, midway of its length, a peripheral row of orifices 46 which communicate with the chamber 45. The outer wall of the annular chamber is formed with two orifices 47 and 48 disposed adjacent its ends. The slide 49 of this distributor valve is a simple hollow and smooth cylinder, in the wall of which is formed a peripheral row of orifices or slots 50. These orifices are disposed longitudinally in such a way that they are placed opposite the orifices 46 of the casing in the middle or first position of the slide.

Each slide is fixed to an axial rod, and the two rods 51 and 52 are extended to the outside through a closed end of the casings which is provided with a packing gland or seal about the rod. The opposite end of each casing is simply closed by an annular connecting flange. The two rods 51, 52 are coupled together rigidly by a handle 53 or any suitable coupling member permitting operation of the slides by hand or their control by an automatic device. In the rod 52 are formed three peripheral grooves cooperating respectively with the detent devices 54, 55 to determine the three positions of operation of the slides.

For the cooperation of the distributor with the apparatus shown schematically in Figs. 6 to 8, the orifices 42, 43 are respectively connected to the tubes of compartments 29a, 30a, and the orifices 47, 48 are connected to the tubes of compartments 29b, 30b. The orifice 39, which corresponds to tube 32, is connected to the input piping of the fluid or liquid to be filtered, the open end of the casing or cylinder 35 corresponds to the tube 34 which is connected to the complementary separator, and the open end of the casing or cylinder 36 corresponds to the tube 33 which is connected to the piping ending at the point of use of the purified fluid or liquid.

For the explanation of the operation, the filter chambers have been shown schematically to the right and left of the distributor valve in Figs. 9 to 11, and the paths of flow of the fluid or liquid are indicated by arrows.

*First position (Figs. 6 and 9).*—The slides 44 and 49 occupy their middle position. The fluid to be filtered enters through orifice 39, passes into the peripheral groove of slide 44 and through orifices 40 and 41 into the annular chambers 37 and 38, then into compartments 29a, 30a of chambers 29 and 30, through the filters to penetrate in the purified state into compartments 29b, 30b. From these compartments the fluid flows through orifices 47 and 48 of the distributor into the annular chamber 45, passes through the rows of orifices 46, 50 in the casing 36 and the slide 49 towards the interior of this casing 36, and issues through the open end of the latter to be conducted to the point of use.

*Second position (Figs. 7 and 10).*—The slides 44 and 49 occupy the right end position of their travel (see Fig. 10). The fluid to be filtered enters through orifice 39, passes into the peripheral groove of the slide 44 and through orifices 41 into the annular chamber 38, then through opening 43 into compartment 30a of chamber 30, through the filter and penetrates in the purified state into the compartment 30b. From this compartment the fluid enters through orifice 48 into the annular chamber 45. The rows of orifices 46 and 50, being masked by the slide 49 and casing 36 in this second position, the fluid discharges through orifice 47 from the annular chamber 45, passes into compartment 29b of chamber 29, passes through the filter in the direction opposite to that of filtering and dislodges the deposited impurities and removes them through compartment 29a, orifice 42, annular chamber 37, the row of orifices 40, now uncovered by slide 44, and the open end of casing 35 toward the complementary separator.

*Third position (Figs. 8 and 11).*—The slides 44 and 49 occupy the left end position (in Fig. 11). The fluid to be filtered enters through orifice 39, passes into the peripheral groove of slide 44 and through orifices 40 into the annular chamber 37, then into compartment 29a of chamber 29, passes through the filter 27 and penetrates in the purified state into compartment 29b, enters through orifice 47 into the annular chamber 45. The rows of orifices 46 and 50, being covered by slide 49 and casing 36 in this third position, the fluid issues through orifice 48 from the annular chamber 45, passes into compartment 30b of chamber 30, passes through the filter in the direction opposite to that of filtration and dislodges the impurities deposited, entraining these impurities through compartment 30a, orifice 43, the annular chamber 38, the row of orifices 41, then uncovered by the slide 44, and the open end of the casing 35 towards the complementary separator.

The device shown in Figs. 12 to 14 comprises two filter chambers 60 and 61 arranged side by side, and connected in a block and provided on one side with a common assembly flange 62, in which is formed a shallow circular recess 63. The interior arrangement of the filters may be of any sort. In this example each filter chamber is divided by a partition 64 into an upper compartment which is the intake compartment for the fluid to be filtered, and a lower compartment which is the outlet compartment for the filtered fluid. The partition 64 is movable and guided with a tight fit like a piston in each filter chamber. It has several circular openings adapted to receive an end of candle filters or the like 65. This partition is fixed to a central tube 66, on the upper part of which a circular plate 67 is slidably mounted, and which is applied on the upper ends of the candle filters 65. A nut screwed onto tube 66 permits axial tightening or clamping of the filters. The central tube 66 is fitted on an axial rod 69 embedded in the bottom of the chamber, and on the upper part of which is screwed a nut 70 designed for clamping tube 66. Each chamber is closed and sealed by a lid 71 through which rod 69 passes and which is held in place by a nut 72 screwed onto the upper end of this rod. This arrangement permits the preparation of each filter block outside of the chamber and its easy installation and removal for replacement or repairs. As a matter of fact it is sufficient first to unscrew nut 72 to be able to withdraw lid 71 and then to unscrew nut 70 to withdraw tube 66, and with it the partition 64, plate 67 and the filters clamped between these two elements.

In the circular recess 63 of the flange 62 there is positioned a circular plate 73, the outer face of which is finely polished to form a distribution element. In this plate are formed four circular orifices 73a, 73b, 73c, 73d, superimposed two by two on both sides of a vertical plane passing through the center of the plate 73. The two orifices 73a, 73b on the left side (Fig. 12) communicate respectively with the upper and lower compartments of the filter chamber 60 through corresponding openings formed in the flange 62. The two orifices 73c, 73d on the right side communicate in the same manner respectively with the upper and lower compartments of filter chamber 61.

On the flange 62 is fixed a circular distribution housing 74 provided with an input tube 75 for the fluid to be filtered and an outlet tube 76 for the filtered fluid. This housing is divided on the inside into two superposed compartments by a horizontal partition 77 disposed in a plane passing through the center of the circular plate 73, and making a sealing joint with the smooth surface of this plate. Above and below the partition 77 two pivots or stub shafts 78 and 79 are mounted to rotate, the axes of which are disposed in the vertical plane passing through the center of plate 73. On the pivots or shafts are keyed, in the housing 74, two eccentric cup-like valve members 80, 81, each containing a sealing pad applied by means of a spring to the smooth surface of the plate 73. The arrangement is such that the pad of cup-like valve member 80 may alternately cover one of the orifices 73a or 73b, and the pad of cup-like valve member 81 may alternately cover one of the orifices 73c or 73d. Outside of housing 74, the two shafts are kinematically connected together by two meshing pinions 82, 83 and protected by a cover 84. The upper shaft is extended through the cover to the outside and supports a hand wheel 85.

The lower compartments of the two filter chambers 60, 61 which receive the filtered fluid are connected together by a conduit 86 in which is interposed a valve 87.

The upper compartments of the two filter chambers are respectively provided with openings having valves 88, 89, which are connected by conduits (not shown) to a filter sack similar to the sack 17 in Figs. 1 and 2.

Figure 15:
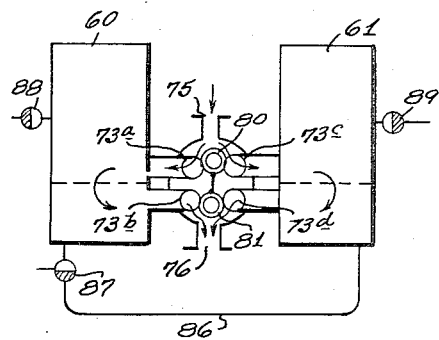
Figs. 15 to 19 are schematic views showing the different positions of operation of this apparatus.

The operation of this apparatus is as follows:

*First position* (Fig. 15).—This position is for filtering simultaneously through the two chambers 60 and 61.

The hand wheel 85 is shifted to bring the pads of the cup-like members 80 and 81 to middle position, so that all the orifices 73a to 73d are uncovered. The valves 87, 88 and 89 are closed. The fluid to be filtered entering through tube 75 of the distributor passes through orifices 73a and 73c into the upper compartments of the two chambers 60, 61, passes through the filters 65 (which for purposes of simplicity and clarity may be assumed to be a simple filter cloth stretched at the level of the partition 64), and penetrates after filtering into the lower compartments of chambers 60 and 61. Thes filtered fluid passes through the orifices 73b, 73d and issues through tube 76 from the distributor.

Figure 16:
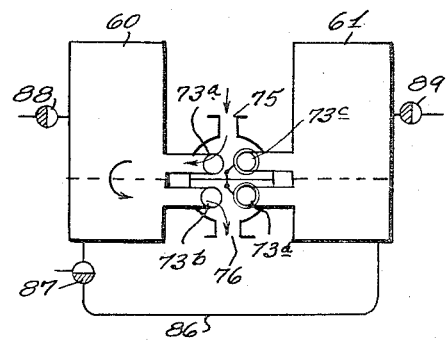

*Second position* (Fig. 16).—This position is for filtering through chamber 60 on the left while leaving chamber 61 on the right out of service.

The wheel 85 is shifted to cover the orifices 73c, 73d. The valves 87, 88 and 89 are closed. The fluid to be filtered entering through tube 75 of the distributor passes through orifice 73a into the upper compartment of chamber 60, passes through the filter or filters 65, and penetrates after filtering into the lower compartment. The filtered fluid passes through orifice 73b and issues through tube 76 of the distributor. Chamber 61 is completely isolated, and we may therefore open its lid 71 for inspection or replacement of the filter block.

Figure 17:
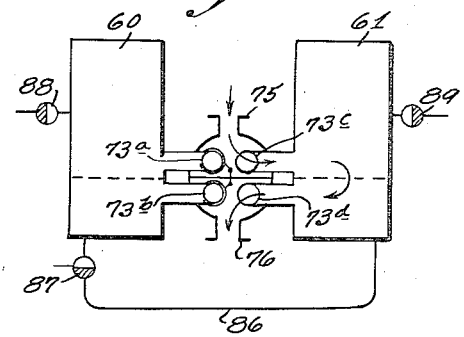

*Third position* (Fig. 17).—This position is for filtering through chamber 61 on the right while leaving chamber 60 on the left out of service.

The hand wheel 85 is shifted to cover the orifices 73a, 73b. Valves 87, 88 and 89 are closed. The fluid to be filtered entering through tube 75 of the distributor passes through orifice 73c into the upper compartment of chamber 61, passes through the filter or filters 65, and penetrates after filtering into the lower compartment. The filtered fluid passes through orifice 73d and issues through the tube 76 from the distributor. Chamber 60 is completely isolated and it may therefore be opened for inspection or repairs.

Figure 18:
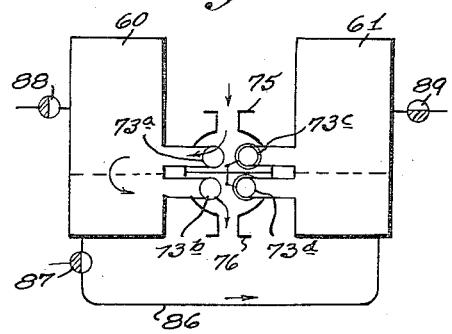

*Fourth position* (Fig. 18).—This position is for filtering through chamber 60 on the left and using a part of the filtered fluid to clear out the filter or filters of the right-hand chamber 61.

The wheel 85 is shifted to cover the orifices 73c, 73d. Valve 88 is closed but the two valves 87 and 89 are opened. The fluid to be filtered entering through tube 75 of the distributor passes through orifice 73a into the upper compartment of chamber 60, through the filter or filters 65, and penetrates after filtering into the lower compartment. With the valves 87 and 89 open, only a part of the filtered fluid passes through orifice 73b to discharge through tube 76 from the distributor, while the other part passes through valve 87 and conduit 86 into the lower compartment of chamber 61, passes through the filter or filters 65 in this chamber in the direction opposite to that of filtering and penetrates with the impurities removed into the upper compartment, and passes through the open valve 89 into the sack 17 of the receiving tank (Figs. 1 and 2). In this way fluid already filtered is used to clear out the filter or filters in chamber 61.

Figure 19:
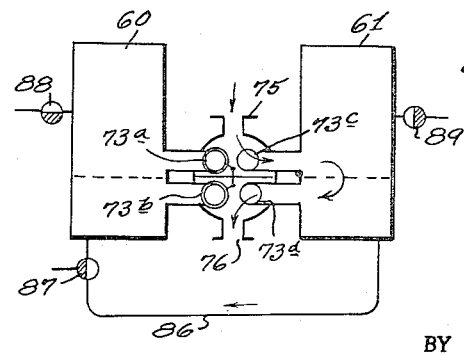

*Fifth position* (Fig. 19).—This position is for filtering through chamber 16 on the right and using a part of the fluid filtered to clear out the filter or filters in chamber 60 on the left.

The control wheel 86 is shifted to cover orifices 73a, 73b. Valves 87 and 88 are opened and valve 89 closed. The fluid to be filtered, entering through tube 75 of the distributor, passes through orifice 73c in the upper compartment of chamber 61, passes through the filter or filters 65, and penetrates after filtering into the lower compartment. The valves 87 and 88 being open, while the valve 89 is closed, a part of the fluid filtered passes through orifice 73d to issue through tube 76 of the distributor, while the other part passes through valve 87 and conduit 86 into the lower compartment of chamber 60, passes through the filter or filters 65 in this chamber in the direction opposite to that of filtering, and penetrates with the impurities removed into the upper compartment and passes through valve 88 into the sack 17 of the receiving tank (Figs. 1 and 2). In this way fluid already filtered is used to clear out the filter or filters in chamber 60.

Figure 20:
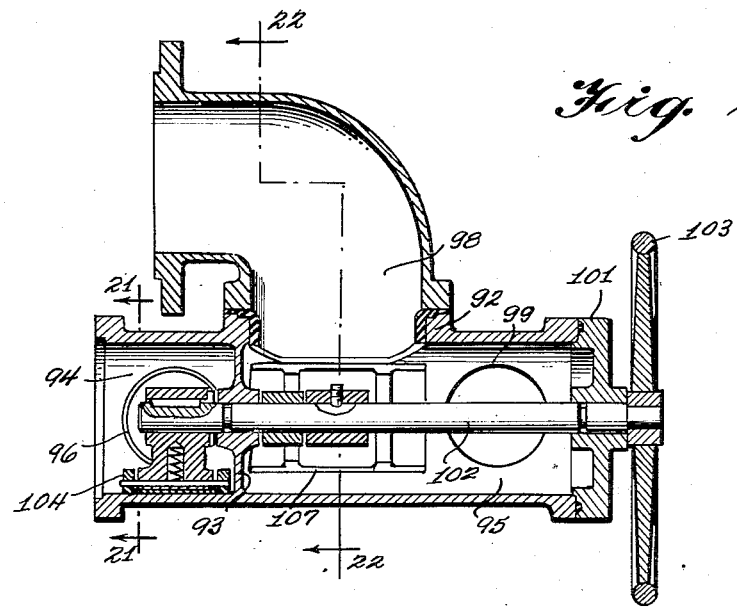
Fig. 20 is an axial section of a modification of the distributor.
Figure 22:
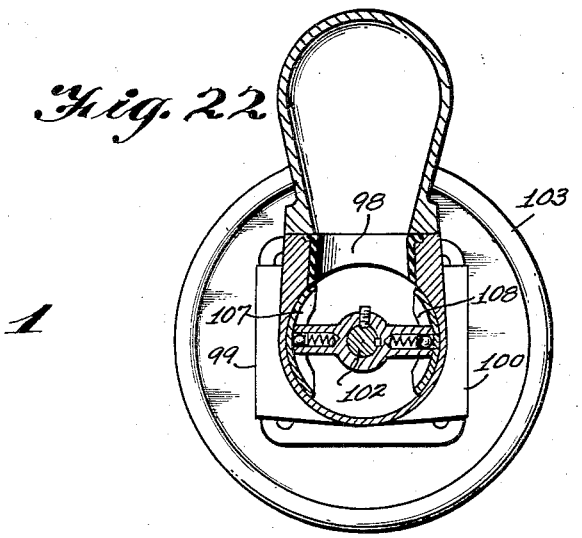
Fig. 22 is a cross-sectional view taken on line XXII—XXII of Fig. 20.
Figure 21:
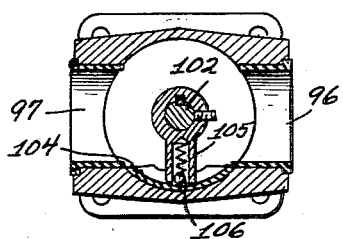
Fig. 21 is a cross-sectional view taken on line XXI—XXI of Fig. 20.
Figure 23:
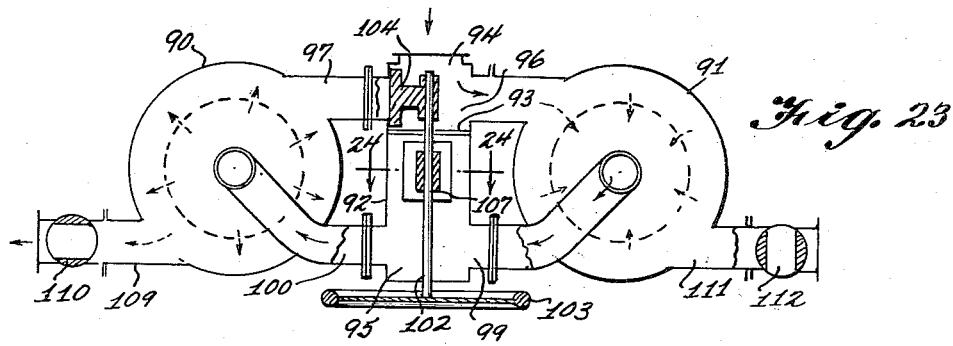
Figs. 23 to 27 are schematic views showing the different positions of operation of this distributor combined with two filters.
Figure 24:
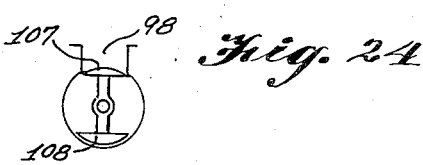
Figure 25:
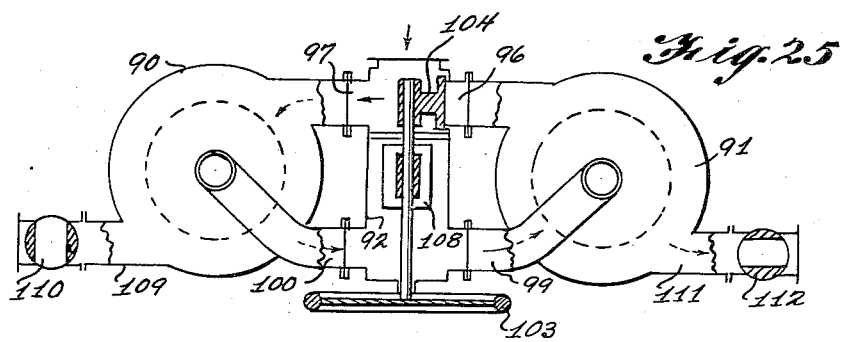
Figure 26:
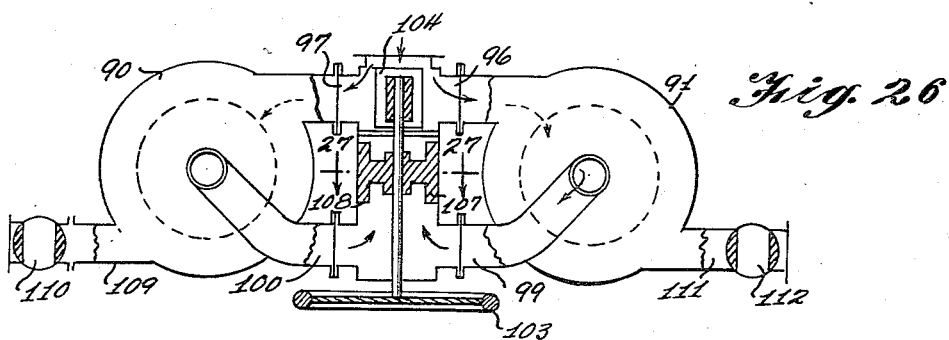
Figure 27:

The assembly shown in Figs. 20 to 27 comprises a distributor valve of the type with rotary valve elements, the details of which are shown in Figs. 20 and 22, and two filtering chambers 90 and 91, the arrangement of which is schematically shown in Figs. 23 to 27.

The distributor comprises a cylindrical casing 92 divided by a transverse partition 93 into a small compartment 94 at one end and a large compartment 95. The small compartment is provided with a flange for connection to input piping for the fluid to be filtered. In the peripheral wall of this compartment are formed two diametrically opposed orifices 96 and 97. The peripheral wall of the large compartment has, adjacent the partition 93, an orifice 98, the axis of which is perpendicular to that of the orifices 96 and 97 and which is in communication with an elbow for connection to piping for discharge of the filtered fluid. In the peripheral wall of this large compartment and adjacent the end of the casing 92 opposite the flange are provided two diametrically opposed orifices 99 and 100, through which the distributor receives the filtered fluid issuing from the filter chambers 90 and 91. This end of the casing 92 is closed by a sealed lid 101. This lid as well as the partition 93 have bosses in which are formed central axial bore in which is rotatably mounted a spindle 102 extending through lid 101 to the exterior of the casing and carrying a hand wheel 103. Spindle 102 also extends through partition 93 into the small compartment 94 and therein carries a rotary valve member comprising a shoe 104 in the form of a cylindrical segment conforming to and tightly fitting the shape of the inside cylindrical surface of the small compartment. This shoe is coupled to a radial arm 105 carried in rotation by the spindle 102, and it is applied against the wall of the pipe by a compression spring 106. The width and length of the shoe are chosen so that it may completely cover one or the other of the two lateral orifices 96 and 97.

The orifice 98 of the large compartment 95 is controlled by two diametrically opposed shoes 107, 108 which are a part of two rotary valve elements similar to rotary valve member 104, 106 which rotate with spindle 102. In the example shown, the radial arms carrying the shoes 107 and 108 are perpendicular to arm 105 carrying shoe 104, because the axis of orifices 96 and 97 is perpendicular to the axis of orifice 98. This arrangement is not indispensable because it would be equally possible to provide the housing 92 of the distributor with lateral orifices with parallel axes. The important thing is that the orifice 98 be covered by one or the other of the shoes 107 or 108 every time that shoe 104 covers one or the other of the diametrically opposed orifices 96 or 97. Inversely, the orifice 98 is uncovered (Fig. 22) each time that the shoe 104 occupies its middle position (Fig. 21) and thus uncovers the two orifices 96 and 97. The orifices 99 and 100 are not controlled by any valve and are therefore permanently open.

It will be assumed that the filter chambers 90 and 91 (Fig. 23 and the following) are cylindrical and divided by a filter cloth, also cylindrical, into an inner compartment and an outer annular compartment. It should be understood that the form of the filter chambers is simply mentioned for simplicity and by way of example and they may have any other form. The orifices 96 and 97 of the distributor are respectively connected by a tube to the outer compartments of the two filter chambers. Orifices 99 and 100 of the distributor are respectively connected by tubes to the inner compartments of the filter chambers. The filter chamber 90 is provided with a tube 109 extending from the outer compartment, and which is provided with a valve 110. The filter chamber 91 is fitted with a tube 111 extending from the outer compartment and provided with a valve 112.

The operation of this apparatus is as follows:

*First position (Figs. 23 and 24).*—In this position a fluid is filtered in chamber 91 and at the same time the filter in chamber 90 is cleared.

The wheel 103 is shifted to cover orifice 97 with the shoe 104. One of the shoes 107 or 108 then automatically covers orifice 98. Valve 110 is opened and valve 112 closed. The fluid to be filtered entering into compartment 94 of the distributor passes through orifice 96 into the outer compartment of chamber 91 and passes through the cylindrical filter cloth which retains the impurities and allows the purified fluid to penetrate into the inner compartment, from which it passes through orifice 99 into the compartment 95 of the distributor. Since the orifice 98 is covered, the purified fluid cannot issue at this point, but as valve 110 is open, the fluid in question passes through orifice 100 of the distributor into the inner compartment of chamber 90, passes through the cylindrical filter cloth in the direction opposite to that of filtering, removing the impurities deposited on this cloth by a previous filtering, and discharges with these impurities through tube 109 and valve 110 to be fed into filter sack 17 of tank 7 (Figs. 1 and 2). In this way the fluid already filtered is used to clear the filter in chamber 90.

*Second position (Fig. 25).*—In this position a fluid is filtered in chamber 90 and at the same time the filter in chamber 91 is cleared.

The wheel 103 is shifted to cover orifice 96 with shoe 104. One of the shoes 107 or 108 then automatically covers orifice 98 as before. Valve 112 is opened and valve 110 closed. The fluid to be filtered entering into compartment 94 passes through orifice 97 into the outer compartment of chamber 90. The cylindrical filtering cloth retains the impurities and lets the purified fluid penetrate into the inner compartment from which it passes through orifice 100 into the compartment 95 of the distributor. With orifice 98 covered and valve 110 closed, the fluid in question passes through orifice 99 into the inner compartment of chamber 91, passes through the cylindrical filter cloth in the direction opposite to that of filtration, removing the impurities and entrains the latter through tube 111 and valve 112, and discharges into the sack 17 of tank 7 (Figs. 1 and 2). In this case the already filtered fluid is used to clear the filter in chamber 91.

*Third position (Figs. 26 and 27).*—In this position a fluid is filtered simultaneously in the two chambers 90 and 91.

The wheel 103 is shifted to give shoe 104 one of its intermediate positions (Fig. 21), it covers neither of the orifices 96 or 97. The shoes 107, 108 are then automatically placed in such a way that orifice 98 will be uncovered. The two valves 110 and 112 are closed. The fluid to be filtered, entering compartment 94 of the distributor, is divided into two currents passing respectively through orifices 96 and 97 into the outer compartments of chambers 90 and 91. The fluid purified by its passage through the cylindrical filter cloths of the two chambers penetrates into the inner chambers, passes through orifices 99, 100 into compartment 95 of the distributor, in which the two currents are reunited, and issue through orifice 98 to flow towards the point of use.

Figure 28:
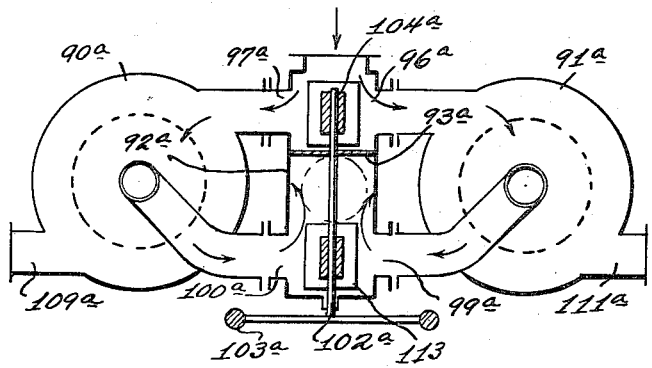
Figs. 28 to 30 are schematic views showing the different positions of operation of another modified form of distributor combined with two filters.
Figure 29:
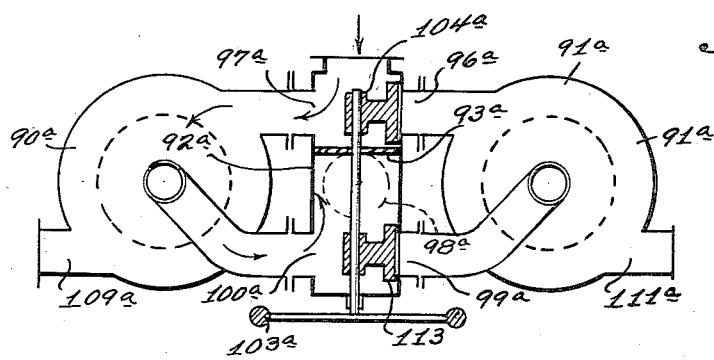
Figure 30:
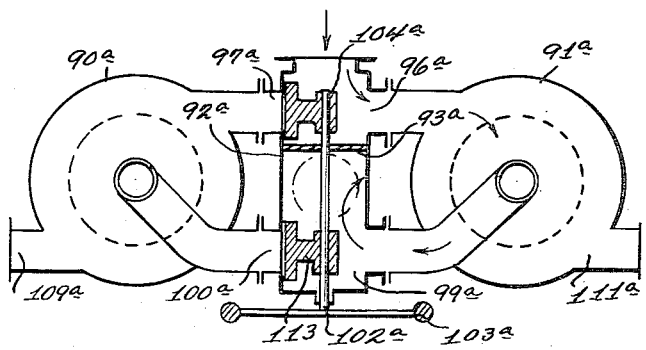

Figs. 28 to 30 schematically show an installation substantially similar to that in Figs. 20 to 27, in the sense that the distributor comprises a casing 92a similar to casing 92 of Figs. 21 to 27 and a valve shoe 104a similar to shoe 104 of Figs. 23 to 26, while the shoes 107, 108 of Figs. 21–27 are eliminated and replaced by a single shoe 113 mounted on the spindle 102a to cover alternately one of the orifices 99a or 100a. This shoe 113 is oriented in exactly the same direction as shoe 104a in such a way that the two shoes may simultaneously cover either the orifices 96a and 99a, on one hand, or orifices 97a and 100a on the opposite side of the casing 92a. The tubes 109a and 111a of the filter chambers 90a and 91a are permanently plugged. Orifice 98a is permanently open. This arrangement is designed for an installation in which it is desired to isolate one of the filter chambers for inspection or repair while the filtering continues in the other chamber.

The operation is the following:

*First position (Fig. 28).*—In this position a fluid is filtered simultaneously in the two chambers.

Wheel 103a is shifted to uncover the two orifices 96a and 97a which at the same time uncovers the orifices 99a, 100a of the distributor. The fluid to be filtered entering compartment 94a of the distributor is divided into two currents which pass through orifices 96a and 97a into the outer compartments of the two chambers 90a and 91a. The cylindrical filters retain the impurities and the purified currents penetrate into the interior compartments of the chambers 90a and 91a and pass through orifices 99a and 100a into compartment 95a of the distributor, where they are reunited and issue through orifice 98a to flow towards the point of use.

*Second position (Fig. 29).*—In this position chamber 91a is isolated while the fluid continues to filter through chamber 90a.

Wheel 103a is shifted to simultaneously cover orifices 96a and 99a of the distributor with shoes 104a and 113. The fluid to be filtered, entering into compartment 94a of the distributor, passes through orifice 97a into the outer compartment of the chamber 90a and passes through the filter which retains the impurities. The filtered fluid penetrating into the inner compartment passes through orifice 100a into compartment 95a of the distributor and issues through orifice 98a towards the point of use.

The chamber 91 is therefore isolated and can be opened for inspection or repair.

*Third position (Fig. 30).*—In this position chamber 90a is isolated while the fluid continues to filter through chamber 91a.

Wheel 103a is shifted to simultaneously cover orifices 97a and 100a with shoes 104a and 113. The fluid to be filtered, entering into compartment 94a of the distributor, passes through orifice 96a into the outer compartment of chamber 91a, and passes through the filter which retains the impurities. The filtered fluid penetrating into the inner compartment passes through orifice 99a in compartment 95a of the distributor, and issues through orifice 98a to flow towards the point of use.

Chamber 90a is therefore isolated and can be opened for inspection or repair.

In the installation shown in Figs. 31 to 37, each of the filter chambers of a battery is equipped with a distributor and a hand pump for clearing the filters.

Figure 31:
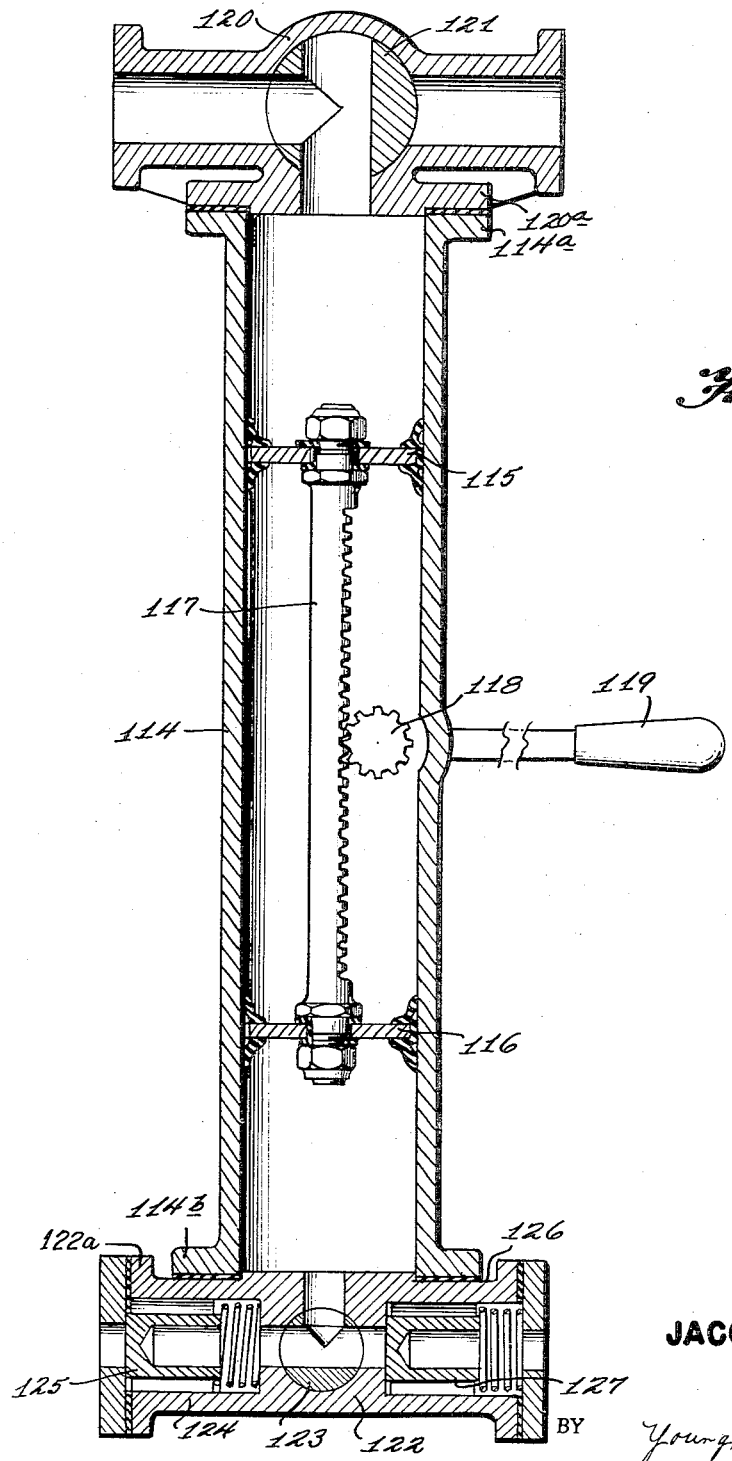
Fig. 31 is a longitudinal sectional view of a hand pump adapted for clearing a filter in service.

The details of the pump and its distributor are shown in Fig. 31.

The pump comprises a hollow cylindrical pump body or casing 114 provided at its two ends with connecting flanges and in which two spaced pistons 115 and 116 are mounted to slide with a sealed fit. The two pistons are rigidly coupled to each other by a toothed bar 117 engaging with a pinion 118 mounted to rotate in the body of the pump, and the pivot or shaft of which is extended to the outside of the casing to receive an actuating lever 119.

Assuming the pump to be placed upright, the upper flange 114a is connected to a flange 120a of the casing 120 of a three-way valve, the plug 121, of which is provided with a diametrical channel from which a lateral channel branches off.

The lower flange 114b is connected to a fitting 122a of the casing 122 of a three-way valve, the plug 123 of which is provided with a diametrical channel from which a lateral channel branches off. The intake tube 124 of the valve casing 122 contains a spring-loaded, non-return valve 125 which opens in the direction of the plug 123. The outlet 126 of valve casing 122 contains a spring-loaded non-return valve 127 which opens away from the plug 123.

The filter chamber 128, also assumed to be placed upright, is divided by a large surface filter 129 into a lower compartment and an upper compartment. The lower compartment serves to receive the fluid to be filtered arriving through tube 130 in which is inserted a non-return valve 131 preventing discharge of fluid through this tube 130 from chamber 128. This lower compartment is connected to the intake tube 124 of three-way valve 122. The upper compartment of chamber 128 is connected by a conduit to one of the tubes or ports of the upper three-way valve 120, the other tube or port of which is connected to the piping 132 leading to the point of use of the filtered fluid while the lateral channel of the valve casing 120 communicates with the upper compartment of the pump.

The distributor formed by the two three-way valves may occupy two positions.

The operation of the installation is as follows:

*First position or normal operating position (Fig. 32).*—The plug 121 of the upper valve 122 places the upper compartment of chamber 128 in communication with the discharge conduit 132, but the upper compartment of the pump is shut off. The pistons 115, 116 preferably occupy the lower position. The plug 123 of the lower valve places the lower compartment of the pump in communication with the tube 126 through non-return valve 127 but shuts off communication with tube 124.

The fluid to be filtered, arriving under pressure through tube 130, flows through one-way valve 131 and enters into the lower compartment of chamber 128. The plug 123 of the lower valve being closed while the plug 121 of the upper valve is open, the fluid passes through filter 129 which retains the impurities. The purified fluid penetrating into the upper compartment of chamber 128 then passes through the channel in plug 121 into the outlet conduit 132.

*Second position (Figs. 33 to 37).*—In this position filter 129 of chamber 128 is cleared.

Figure 33:
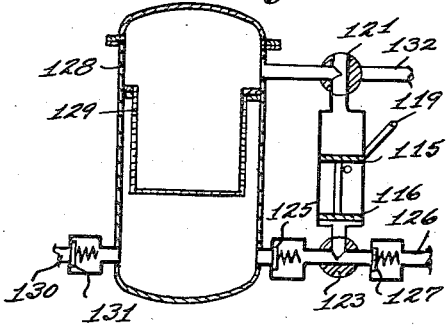
Figure 34:
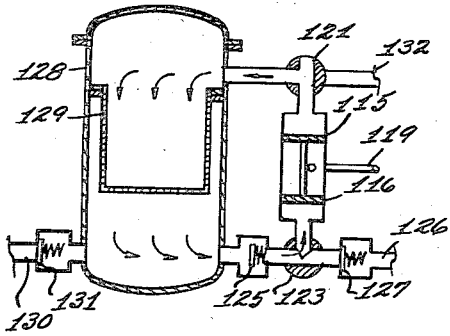
Figure 35:
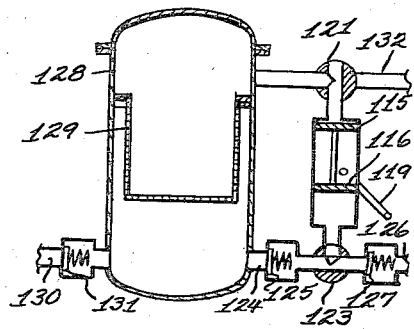
Figure 36:
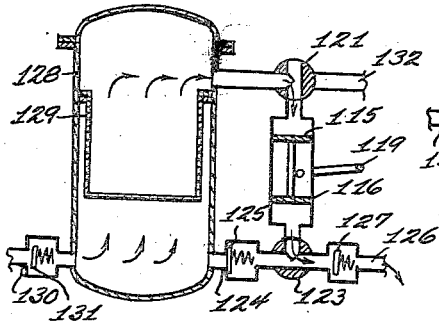
Figure 37:
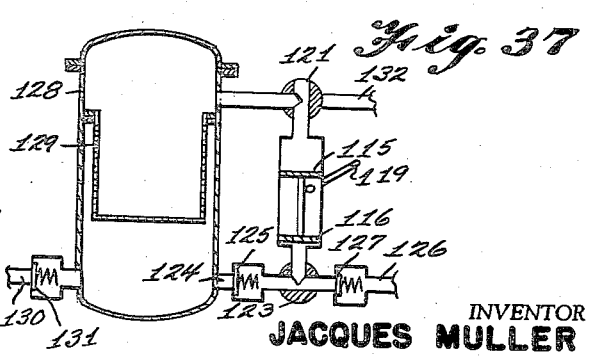

The upper and lower three-way valves 120 and 122 are adjusted to place the lower compartment of the chamber 128 in communication with the lower compartment of the pump and with tube 126, and to place the upper compartment of the chamber 128 in communication through plug 121 of the upper valve with the upper compartment of the pump but not with the outlet conduit 132 (Fig. 33).

The upper compartment of the pump will be filled with fluid or liquid from a previous clearing operation.

The operator lowers lever 129 with force (Figs. 34 and 35) to discharge as quickly as possible the fluid in the upper compartment of the pump which then passes into the upper compartment of the chamber 128, passes through the filter in the direction opposite to that of filtering, the one-way valve 131 being closed, removes from the filter the impurities retained thereon and entrains them, opening one-way valve 125, and penetrates into the lower compartment of the pump the volume of which increases at the same rate as that of the upper compartment diminishes. Upon raising lever 119 (Figs. 36 and 37), pistons 115, 116 are moved down again. The fluid contained in the lower compartment of the pump, thus mixed with the impurities removed from filter 129, is discharged through one-way valve 127 and tube 126 to a sack 17 such as that of tank 7 (Figs. 1 and 2) while the upper piston in descending draws fluid into the upper compartment of chamber 128 and thereby causes a fresh quantity of fluid, to be filtered, to pass through one-way valve 131 into the lower compartment of chamber 128 and through filter 129.

Figure 32:
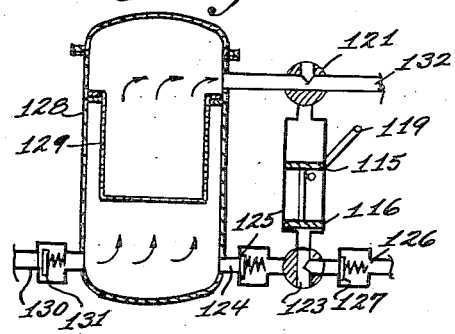
Figs. 32 to 37 are schematic views showing the different positions of operation of an apparatus comprising this pump in combination with a filter.

The valves 120 and 122 of the distributor are returned to the position shown in Fig. 32. The cycle can be repeated as often as desired and the position shown in Fig. 32 reestablished for normal operation.

The installation shown schematically in Figs. 38 to 42 is similar to that of Figs. 31 to 37 except that the hand pump is replaced by a pump actuated by a fluid under pressure and more particularly by the fluid under pressure which is to be filtered.

Each of the filter chambers 133 is divided by a large surface filter 134 into a lower compartment and an upper compartment. The lower compartment serves as in the preceding example to receive the fluid to be filtered which arrives under pressure through a conduit 135. The filtered fluid is discharged from the upper compartment through outlet conduit 136 and flows to the point of use. From the bottom of the lower compartment there depends a conduit 137 which discharges into the sack 17 of the collection tank 7.

The body or casing of pump 138 contains a free sliding piston 139. The compartment of the pump above the piston 139 can be placed in communication with the upper compartment of chamber 133 and with the outlet conduit 136 by means of a three-way valve 140.

The compartment of the pump below piston 139 is connected to the intake conduit 135 for the fluid to be filtered through a conduit 141, in which is inserted a two-way valve 142.

From a point in the conduit 141 between the pump and the valve 142 extends a branch conduit 143 which opens into tank 7 and in which is provided a two-way valve 144.

In the intake conduit 135 for the fluid to be filtered is mounted a two-way valve 145 at a point between the chamber 133 and the valve 142.

In the conduit 137 is provided a two-way valve between chamber 133 and sack 17.

All the valves can be united in a single distributor arranged to occupy three operating positions, and operated by hand or automatically.

Assuming that the distributor in question is operated manually, the operation is as follows:

*First position or normal operation position (Fig. 38).*—The three-way valve 140 places the upper compartment of the filter chamber 133 in communication with the upper compartment of the pump and with the discharge conduit 136. The piston 139 has been completely lowered in a preceding operating cycle. The valves 142, 144 and 146 are closed while valve 145 is open.

The fluid to be filtered enters through conduit 135 into the lower compartment of chamber 133 and passes through filter 134 which retains the impurities. The purified fluid issues from the upper compartment through conduit 136 and flows to the point of use. This fluid also fills the upper compartment of the pump.

*Second position (Figs. 39 to 41).*—In this position filter 134 is cleared. The operator turns the distributor to bring it into this second position in which valve 140 places the upper compartment of the filter chamber in communication with the upper compartment of the pump (Fig. 39) but not with the discharge conduit 136. The valves 142 and 146 are open, the valves 144 and 145 are closed.

The fluid to be filtered, arriving under pressure through conduit 135, no longer passes into the lower compartment of chamber 133 but can enter into the lower compartment of the pump. Under the action of the pressure of this fluid, the free piston 139 suddenly rises (Figs. 40 and 41) and thus discharges fluid already filtered through the filter 134 in the direction opposite to that of filtering. This fluid removes the impurities retained by the filter and entrains them, passing through valve 146 into sack 17 and tank 7.

*Third position (Fig. 42).*—The pump must be returned to starting position.

The valve 140 is retained in position to place the upper compartment of the filter chamber in communication with the upper compartment of the pump but not with the discharge conduit 136. The valves 142 and 146 are closed, the valves 144 and 145 are open. The fluid to be filtered, arriving under pressure through conduit 135, flows into the lower compartment of chamber 133 but can no longer pass into the lower compartment of the pump. The filtering begins again but the filtered fluid passes only into the upper compartment of the pump to lower the piston again. The unfiltered fluid contained in the lower compartment of the pump is discharged into tank 7 through conduit 143 and open valve 144.

As soon as the piston is completely down, the operator reestablishes the normal operating position shown in Fig. 38.

It is understood that the different embodiments of a filtering and filter clearing installation described in respect to the drawing are only adapted to serve as non-limiting examples, and other variations and modifications can be made without departing from the spirit of the invention.

I claim:

1. A filtering apparatus having filters adapted to be cleared while the apparatus is in use comprising at least two filters, and distributor means operable for effecting flow of a fluid to be filtered through one filter to filter the fluid and for effecting flow of filtered fluid through the other filter in a direction opposite that of filtering to clear the other filter of impurities deposited thereon in a previous filtration, said distributor means comprising a fixed valve casing and a rotary valve element, tubular arms extending radially from the rotary valve element in the form of a turnstile, rotatable in a substantially vertical plane, an open tank adapted to contain a liquid to be filtered positioned beneath the distributor, a filter element carried by the free end of each tubular arm and positioned to be immersed in the liquid in the tank when its arm is in a lower position of rotation, a pump having an intake and a discharge, a conduit connecting the pump intake with a port in the distributor casing to place the pump intake in communication with the arm of a filter immersed in the liquid in the tank, and a conduit connecting the discharge of the pump with a port in the distributor casing to place the pump discharge in communication with the arm of a filter just before it is immersed in the liquid in the tank to discharge liquid from the arm through the filter and remove deposit from the latter.

2. An apparatus according to claim 1 including an auxiliary tank to collect liquid ejected through a clogged filter and the deposit entrained therewith.

3. An apparatus according to claim 1 in which the discharge from the pump is connected to a pressure-storage chamber having a pressure indicator.

4. An apparatus according to claim 1 in which liquid to be filtered is fed into the tank through a porous sack suspended in the tank and adapted to remove coarse impurities from the liquid.

References Cited in the file of this patent

UNITED STATES PATENTS

| | | |
|---|---|---|
| 2,095,447 | Lentz | Oct. 12, 1937 |
| 2,483,312 | Clay | Sept. 27, 1949 |
| 2,486,046 | Majneri | Oct. 25, 1949 |

FOREIGN PATENTS

| | | |
|---|---|---|
| 724,530 | Germany | Aug. 28, 1942 |